United States Patent
van den Bogaerd

(10) Patent No.: US 7,492,110 B2
(45) Date of Patent: Feb. 17, 2009

(54) DRIVE, AND USE OF A DRIVE

(75) Inventor: Franciscus Nicolaas A. M. van den Bogaerd, Wierden (NL)

(73) Assignee: Van der Graaf B.V., Vollenhove (NL)

( * ) Notice: Subject to any disclaimer, the term of this patent is extended or adjusted under 35 U.S.C. 154(b) by 95 days.

(21) Appl. No.: 11/481,425

(22) Filed: Jul. 6, 2006

(65) Prior Publication Data
US 2007/0018596 A1 Jan. 25, 2007

(30) Foreign Application Priority Data
Jul. 6, 2005 (EP) .................... 05076564

(51) Int. Cl.
*F16H 35/00* (2006.01)
(52) U.S. Cl. ............................. 318/9; 318/14
(58) Field of Classification Search .............. 318/3–15
See application file for complete search history.

(56) References Cited

U.S. PATENT DOCUMENTS

| | | | | |
|---|---|---|---|---|
| 3,861,485 | A * | 1/1975 | Busch ................ 180/65.7 |
| 4,417,185 | A * | 11/1983 | Bullat ................... 318/2 |
| 4,482,847 | A * | 11/1984 | Rudich et al. .............. 318/9 |
| 4,487,270 | A | 12/1984 | Huber .................... 173/12 |
| 4,558,446 | A | 12/1985 | Banba et al. |
| 4,686,433 | A * | 8/1987 | Shimizu ................... 318/50 |
| 4,687,976 | A * | 8/1987 | Shimizu .................. 318/432 |
| 4,743,817 | A * | 5/1988 | Shimizu .................. 318/488 |
| 4,963,866 | A | 10/1990 | Duncan |
| 5,793,174 | A * | 8/1998 | Kovach et al. .............. 318/468 |
| 5,878,020 | A | 3/1999 | Takahashi |
| 5,970,906 | A * | 10/1999 | Hrescak et al. .............. 114/378 |
| 5,975,185 | A * | 11/1999 | Miller et al. ................ 160/310 |
| 6,126,143 | A * | 10/2000 | Fukunaga et al. ........... 254/344 |
| 6,628,029 | B2 * | 9/2003 | Astegno .................... 310/105 |
| 7,057,360 | B1 * | 6/2006 | Hsu .......................... 318/105 |
| 7,161,879 | B2 | 1/2007 | Hwang et al. |
| 7,236,687 | B2 | 6/2007 | Kato et al. |
| 2005/0008346 | A1 | 1/2005 | Noguchi et al. |
| 2005/0207262 | A1 | 9/2005 | Terada et al. |

FOREIGN PATENT DOCUMENTS

| | | |
|---|---|---|
| DE | 3930408 A1 | 3/1991 |
| DE | 19803531 A1 | 8/1999 |
| DE | 19811130 A1 | 9/1999 |
| GB | 308959 | 4/1929 |

(Continued)

OTHER PUBLICATIONS

Patent Abstracts of Japan, vol. 10, No. 206 (Jul. 18, 1986) and JP 61045946A (Fujitsu Ltd), Mar. 6, 1986.

(Continued)

*Primary Examiner*—Bentsu Ro
(74) *Attorney, Agent, or Firm*—Jacobson Holman PLLC

(57) ABSTRACT

A drive is provided with an electric motor including a rotor, a stator and a rotor shaft coupled to the rotor. The rotor shaft is coupled via a reduction to a rotatable drive, while the drive is provided with at least one measuring device designed for measuring a load applied during use via the reduction to the electric motor.

18 Claims, 6 Drawing Sheets

FOREIGN PATENT DOCUMENTS

| | | |
|---|---|---|
| GB | 751790 | 7/1956 |
| GB | 992333 | 5/1965 |
| JP | 2005-004912 A | 6/2005 |

OTHER PUBLICATIONS

Patent Abstracts of Japan, vol. 15, No. 171 (Apr. 30, 1991) and JP 03036177A (Nippon Otis Elevator Co), Feb. 15, 1991.

Patent Abstracts of Japan, vol. 1998, No. 5, (Apr. 30, 1998) and JP 10026568A (Yaskawa Electric Corp), Jan. 27, 1998.

Patent Abstracts of Japan, vol. 2000, No. 12, (Jan. 3, 2001) and JP 2000238976A (Mitsubishi Electric Corp), Sep. 5, 2000.

Patent Abstracts of Japan, vol. 2002, No. 3, (Apr. 3, 2002) and JP 2001318013A (Ishikawajima Harima Heavy Ind Co Ltd), Nov. 16, 2001.

Patent Abstracts of Japan, vol. 2003, No. 12, (Dec. 5, 2003) and JP 2004150831A (Yamaha Motor Co Ltd), May 27, 2004.

* cited by examiner

DRIVE, AND USE OF A DRIVE

FIELD OF THE INVENTION

The invention relates to a drive, provided with an electric motor comprising a rotor, a stator and a rotor shaft coupled to the rotor, while the rotor shaft is coupled via a reduction to a rotatable drive means.

BACKGROUND OF THE INVENTION

Such a drive is known per se from practice. A known drive may comprise a motor reductor. An advantageous known drive comprises a drum motor.

In specific cases it is desired to measure the extent to which a drive is loaded. A first example comprises, for instance, the use of the drive in a lifting apparatus, for instance a crane or the like. Another example comprises, for instance, use of a drive in a brake test bench which is designed for testing brakes of vehicles.

Various methods are known for measuring the load on the drive. For instance, with a brake test bench it is known to position a motor reductor in a tilting manner such that a vehicle brake load applied to this motor reductor leads to a proportional tilting of this reductor. A drawback is that such a brake test bench occupies relatively much space and, furthermore, is maintenance-prone.

SUMMARY OF THE INVENTION

The object of the present invention is to eliminate these drawbacks. In particular, the invention contemplates a drive wherein a load on the drive can be determined relatively accurately while the drive can be designed to preferably be relatively insusceptible to maintenance.

To this end, the drive according to the invention is characterized in that the drive is provided with at least one measuring device designed for measuring a load applied during use (via the reduction) to the electric motor.

In this manner, it appears that a load on the drive cat be determined relatively accurately with relatively simple means, while in particular the drive can be designed to be relatively maintenance-proof. It is noted that the wording "load" in the present application should be interpreted broadly and can comprise, for instance, a torque load. A difference in torque which, at a particular load, may arise, during use, between the reduction and the electric motor can be relatively small and therefore be measured relatively well and accurately by the measuring device.

The rotor shaft can for instance simply form part of the measuring device. The rotor shaft can for instance be pressed in axial direction under the influence of a load applied via the reduction to the rotor shaft. In this latter case, the rotor shaft may undergo hardly any displacement, if at all, as a result of this load. Here, the measuring device can be designed for, for instance, measuring, directly or indirectly, an axial pressure applied by the rotor shaft.

According to an advantageous embodiment of the invention, the drive is a drum motor. In particular, the motor can be provided with a drum usable as a drive means which extends around the electric motor. Here, it is advantageous when for instance a sensor part of the measuring device is arranged outside the drum, for instance in a sensor housing. Consequently, heating of this sensor part due to heat development within the c-drum may be prevented, which is beneficial to the accuracy of the sensor measurements.

During use of a drive according to the invention, a load applied via the reduction to the electric motor can be accurately measured by the at least one measuring device. The drive can be employed in many different uses. For instance a lifting apparatus can for instance be provided with at least one drive according to the invention, to drive lifting means. The drive according to the invention can further be advantageously used in an apparatus for testing the brakes of a vehicle, in particular a brake test bench, wherein the apparatus is provided with rollers to start rotation of at least one wheel of the vehicle. At least one of these rollers may for instance comprise a drive according to the invention, particularly when the drive is a drum motor drive. Consequently, the testing apparatus can be designed to be solid, compact and maintenance-proof. Alternatively, for instance at least one of the rollers of the testing apparatus can be coupled to a drive according to the invention, four driving this at least one roller.

BRIEF DESCRIPTION OF THE DRAWINGS

Further elaborations of the invention are described in the subclaims. Presently, the invention will be clarified on the basis of a number of exemplary embodiments and the drawing. In the drawing:

DETAILED DESCRIPTION OF THE PREFERRED EMBODIMENTS

Figure 1:
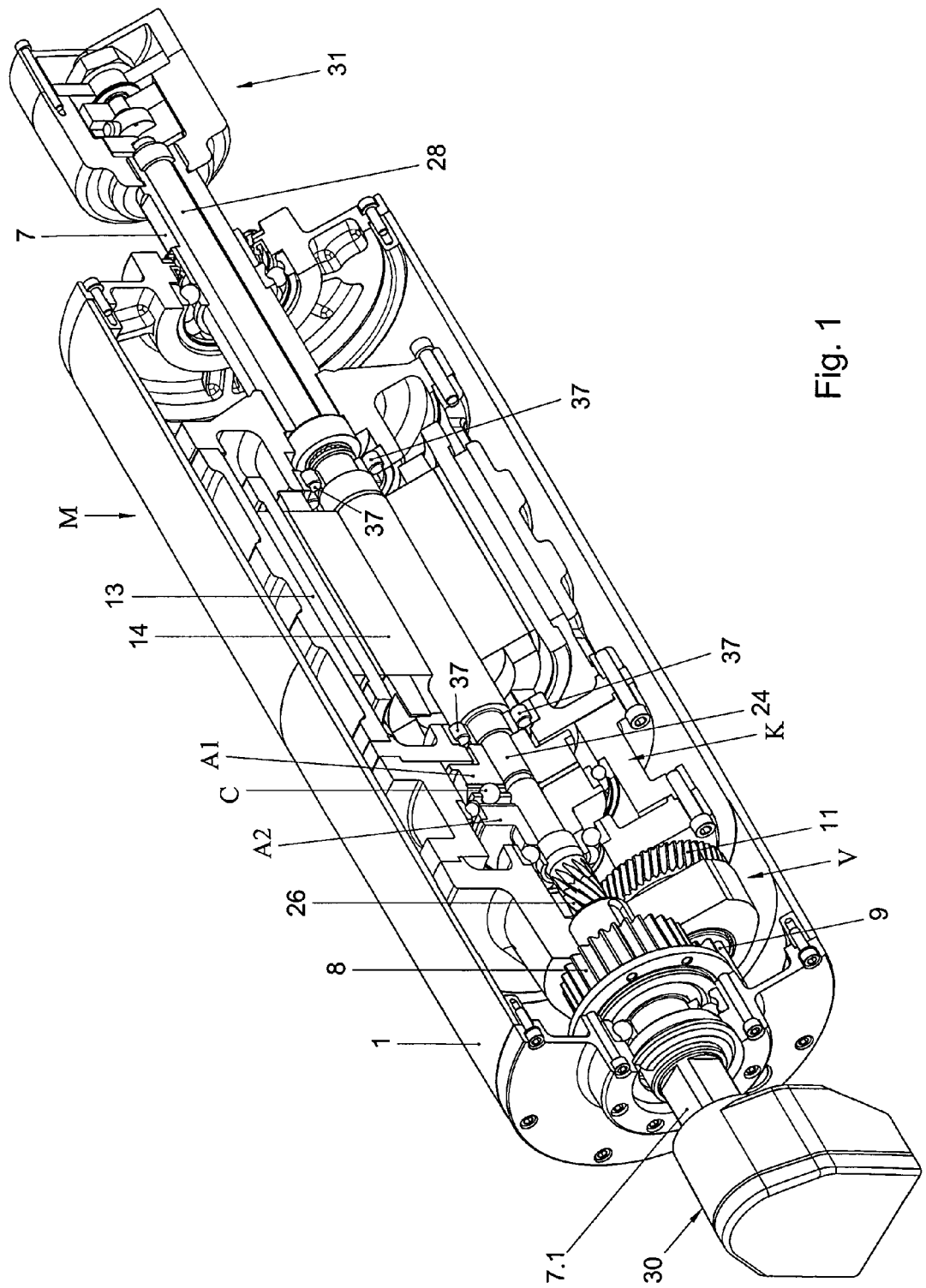
FIG. 1 shows a perspective, exploded side view of a fret exemplary embodiment of the invention.

In the present application, identical or corresponding parts are designated by identical or corresponding reference numerals.

Figure 2:
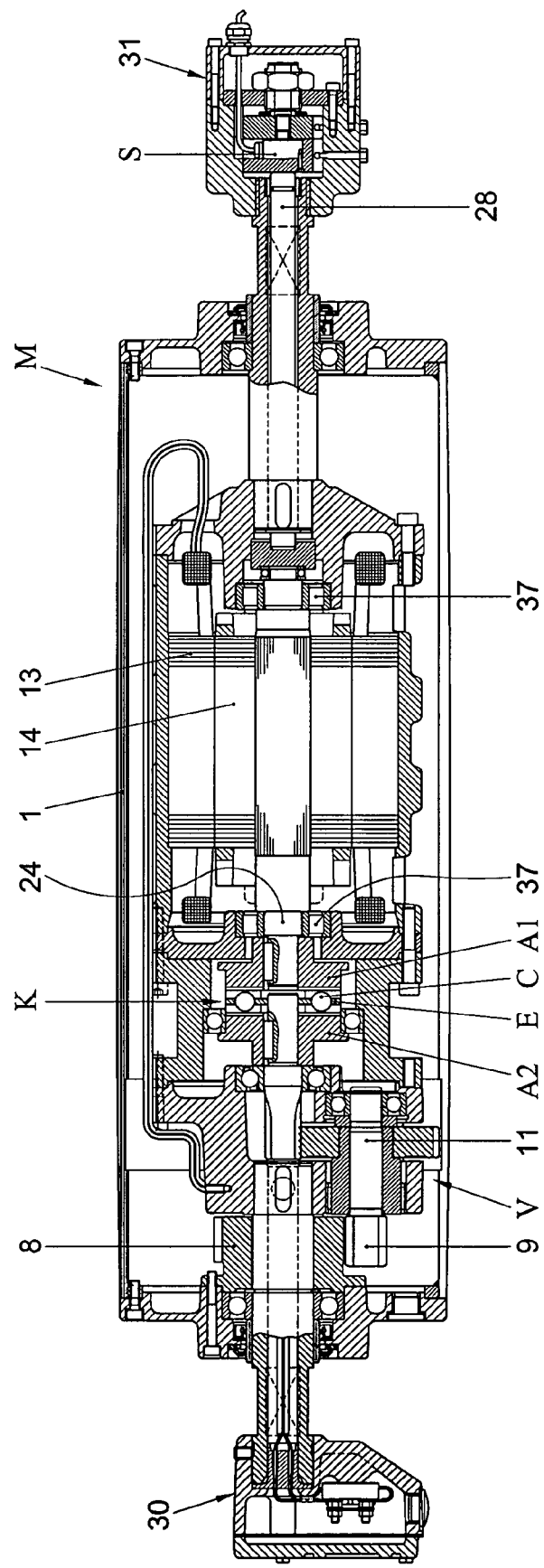
FIG. 2 shows a longitudinal cross-section of the exemplary embodiment represented in FIG. 1.

FIGS. 1 and 2 show an exemplary embodiment according to the invention, comprising a drum motor M. Such a motor is known per se from practice. The drum motor M comprises an electric motor which is provided with a stator 13, rotor 14 and rotor shaft 24. The drum motor M is provided with a drum 1 usable as drive means, which extends around the electric motor 13, 14, 24 and a reduction V. The reduction V comprises a number of reduction gears 8, 9, 11, 26. The drum motor M is provided on both sides with housings 30, 31, which are mounted on the shaft journals 7 and 7.1. During use, in a known manner, the rotor 14 is brought into rotation relative to the stator 13. The rotation of the rotor 14 is transmitted via the rotor shaft 24, coupling K and reduction V to the drum 1, such that the drum 1 is brought into rotation relative to the shaft journals 7 and 7.1.

Figure 3:
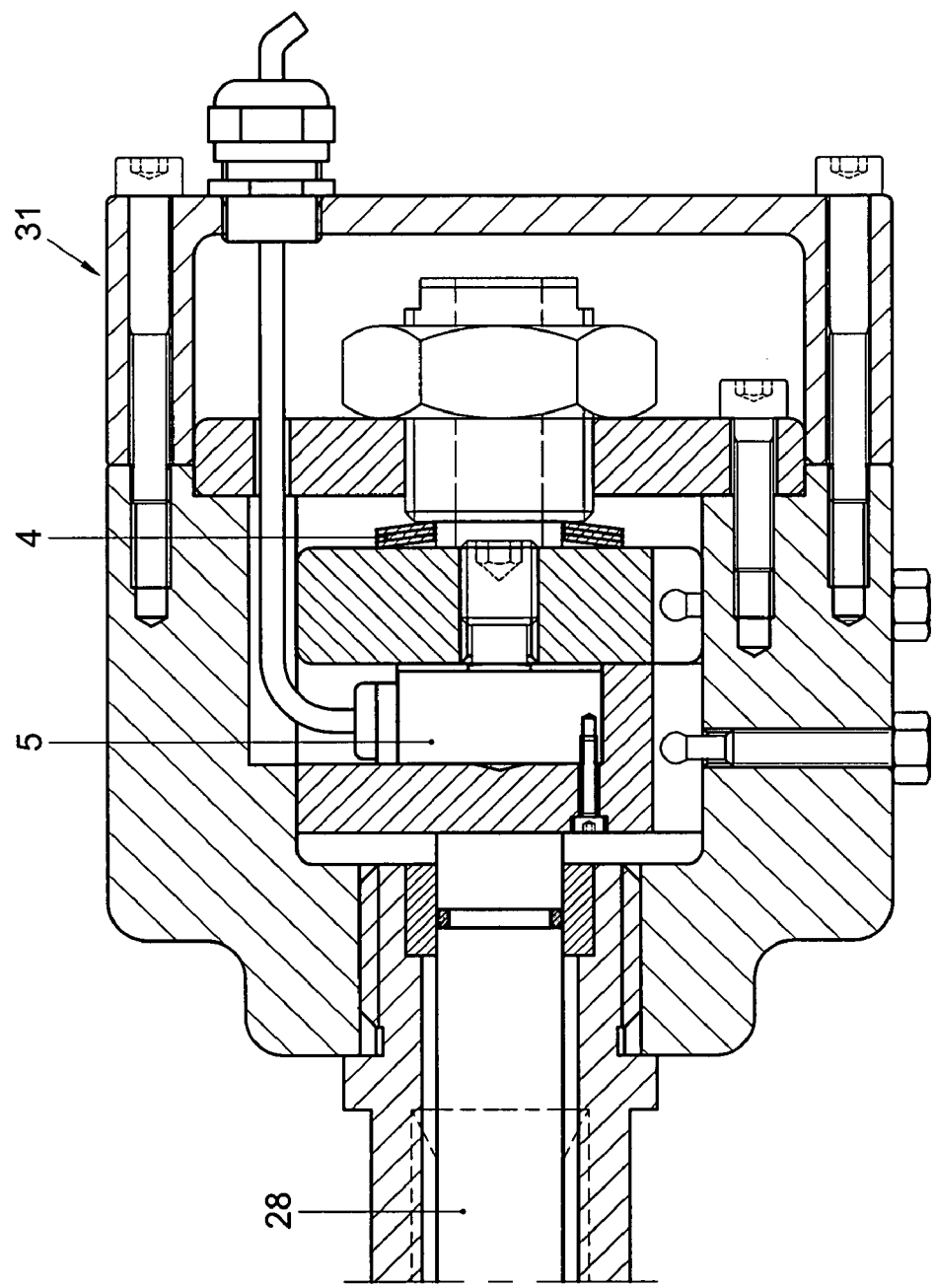
FIG. 3 shows a detail of FIG. 2.

The drum motor M is provided with a measuring device designed for measuring an axial load applied during use. In the exemplary embodiment, the rotor shaft 24 forms a part of the measuring device. As shown in FIGS. 1-3, the exemplary embodiment is furthermore provided with a sensor S which (in the Figures) is arranged in the right-hand housing 31.

In the present exemplary embodiment, the sensor S is arranged on a side of the drive remote from the reduction. The rotor shaft 24 is coupled to a transmission, which transmission is arranged for transmitting an axial displacement and/or axial pressure of the rotor shaft 24 to the sensor S. It will be clear to the skilled person that such a transmission can be designed in different manners. In the exemplary embodiment, the latter transmission comprises an axially displaceable, rotation-secured transmission shaft 28 which is coupled, with for instance a pivot bearing, to the rotor shaft 24.

The rotor shaft 24 can for instance be displaceable in cal direction under the influence of a torque applied by the reduction V to the rotor shaft 24. To this end, the drive is provided with, for instance, cylindrical b, bearings 37 for bearing-mounting the rotor shaft 24.

In addition, the rotor shaft 24 can for instance be pressed in axial direction under the influence of a load, or torque, applied via the reduction to the rotor shaft 24. In that case, the sensor S can be designed for measuring an axial pressure applied by the rotor shaft 24 via the transmission shaft 28.

As shown in FIG. 3, the exemplary embodiment is further provided with spring means, for instance cup springs 4, which are disposed axially behind the sensor S in the right-hand housing 31. With these spring means, the spring constant of which is, preferably, known in advance, for instance thermal expansions of the rotor shaft 24 and/or transmission shift 28 can be obviated in a simple manner.

Figure 7:
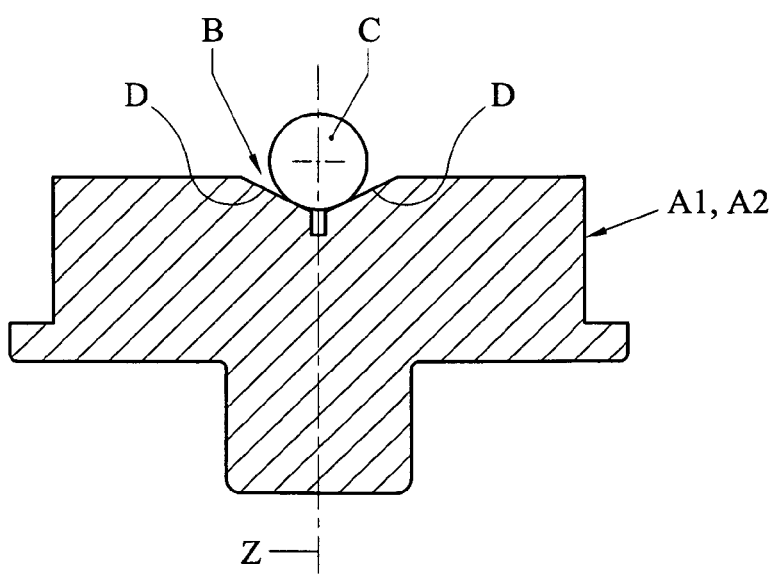
FIG. 7 shows a cross-sectional view along the line VII-VII of FIG. 6 wherein the position of a ball is indicated.

It is furthermore advantageous when the measuring device of the drive is provided with a torque-dependent coupling K which couples the rotor shaft 24 to the reduction V. As shown in FIGS. 1, 2, 4-7, the torque-dependent coupling K is for instance provided with a coupling part A1 that is non-rotatably connected to the rotor shaft 24, and a coupling part A2 that is non-rotatably connected to a transmission gear 26 of the reduction V. Facing sides of the coupling parts A1, A2 are provided with recesses B in which coupling balls C are included. An annular holder E is provided, with suitable openings, for retaining the balls C in these recesses B. During use, run-off surfaces D of the recesses B on the one side and the coupling balls C on the other side can cooperate for forcing the coupling parts A1, A2 apart when different moments of torque are applied to these coupling parts A1, A2. As shown in FIG. 7, the recesses B of the torque-dependent coupling K of the present exemplary embodiment have straight running run-off surfaces D which—viewed in cross-section—include specific angles with (virtual) cross faces Z which may lead to a linear torque-dependent coupling. Alternatively, these run-off surfaces may for instance exhibit a particular curve, for instance for offering a non-linear and/or an especially accurate torque-dependent coupling.

The drive can further be provided with, for instance, positioning means for setting the measuring range of the sensor S.

Further, spring means can be provided to compensate for an axial displacement of rotor shaft 24 and transmission shaft 28 due to thermal expansion. These spring means can be designed in different manners, which will be clear to the person skilled in the art.

It is further advantageous when the sensor S is disposed outside the drum 1, for instance in a housing 31. Consequently, thermal influence of the sensor through temperature fluctuations in the drum 1 may be prevented.

In an alternative elaboration of the invention (not shown), the sensor S and torque-dependent coupling are replaced with, for instance, a torque measuring shaft coupled to the rotor shaft. Such a torque measuring shaft is known per se from practice. The torque measuring shaft can for instance be built-in between the rotor shaft and the reduction V and can also be used for measuring, during use, a load applied by the drum 1 via the reduction to the rotor shaft 24.

Figure 4:
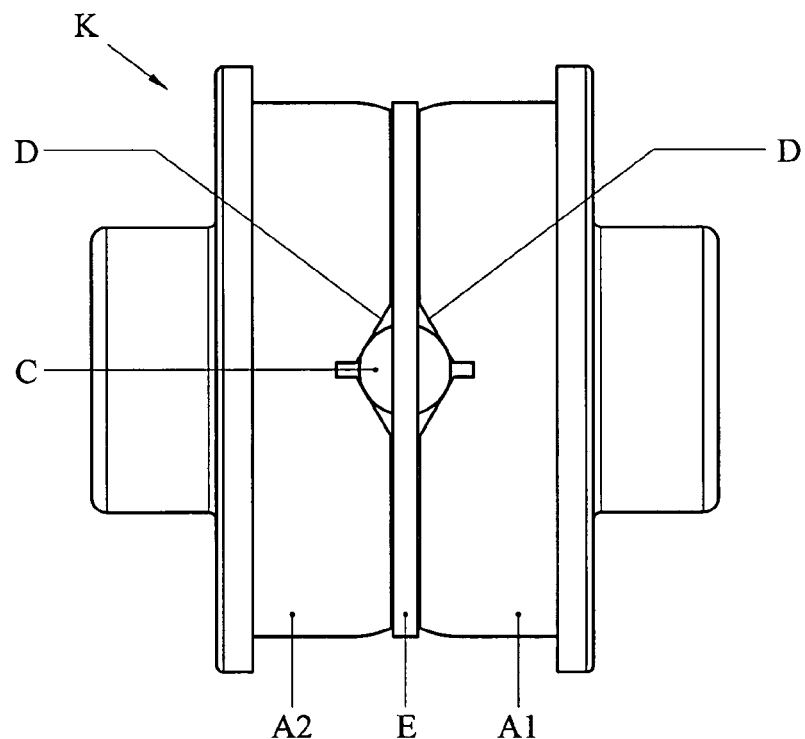
FIG. 4 shows a perspective side view of the torque-dependent coupling in an unloaded condition.
Figure 5:
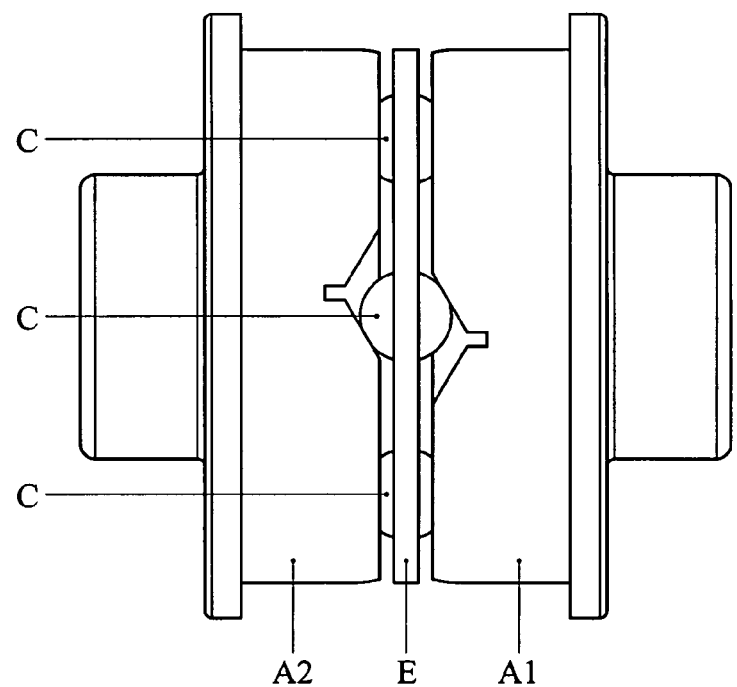
FIG. 5 shows a similar view as FIG. 4, with the coupling in a loaded condition.
Figure 6:
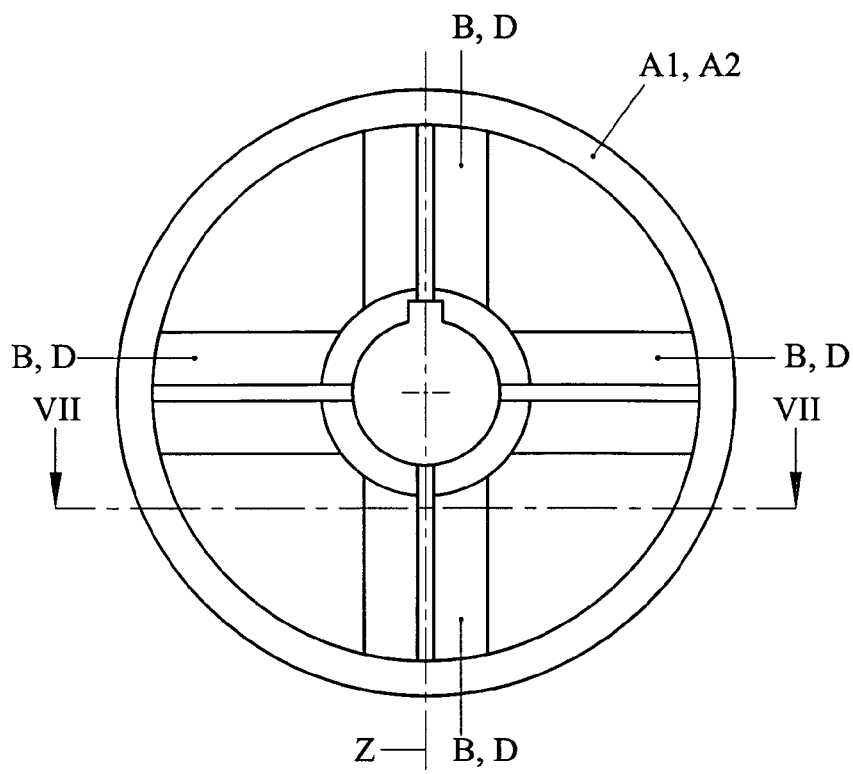
FIG. 6 shows a front view of a part of the torque-dependent coupling, without coupling balls.

During use of the exemplary embodiment represented in FIGS. 1-7, a load applied by the drum 1, via the reduction V to the rotor shaft 24 can be measured accurately and rapidly by the measuring device. An increase of the torque applied to the drum 1 will be transmitted via the reduction V to the torque-dependent coupling K. Consequently, the torque-dependent coupling K will apply an increased axial pressure to the rotor shaft 24. FIGS. 4 and 5 schematically represent how this increase pressure is obtained, i.e. by a torque of the one coupling part A1 relative to the other coupling part A2, while under the influence of the coupling balls C the coupling parts A1, A2 are driven apart over a specific distance (indicated in an exaggerated manner). Via the transmission shaft 28 extending between the rotor shaft 24 and the sensor S, the axial pressure applied to the rotor shaft 24 is transmitted to the sensor S. The sensor S can for instance directly measure the axial pressure. Sensor S may produce a sensor signal that is dependent on the pressure applied to the sensor S. The sensor signal is then a standard for the load of the electric motor, and hence also a standard for a torque applied to the drum 1, which will be clear to the person skilled in the art. The sensor signal can be used and processed in different manners. For instance, the sensor signal S may simply be used in a drive load meter. The sensor signal may further be used to give the alarm or the like when it follows from that signal that the drum motor M is subject to a maximum allowable load. In addition, for the purpose of use, when the drive means 1 has, for instance, already been brought into rotation but is not yet externally loaded, the measuring device can be brought to an initial measuring position, undergo a reset, be thermally conditioned and/or the like.

Figure 8:
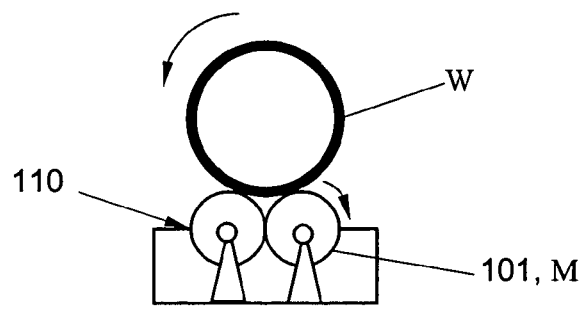
FIG. 8 schematically shows a part of a brake test bench.

FIG. 8 schematically shows an advantageous elaboration of the invention, comprising an apparatus 110 for testing brakes of a vehicle, in particular a brake test bench. The apparatus 110 is provided with rollers 101 for bringing at least one wheel W of the vehicle into rotation. At least one of the rollers 101 comprises a drive according to the invention, for instance a drive M according to the exemplary embodiment represented in FIGS. 1-7. An outside of the drum 101 of the drum motor M can then for instance directly contact the wheel W of the vehicle. In this manner, the measuring device of the drive M can for instance simply be used for measuring a brake load applied by one or more brake systems of the vehicle via the wheel W to the drum motor M.

Figure 9:
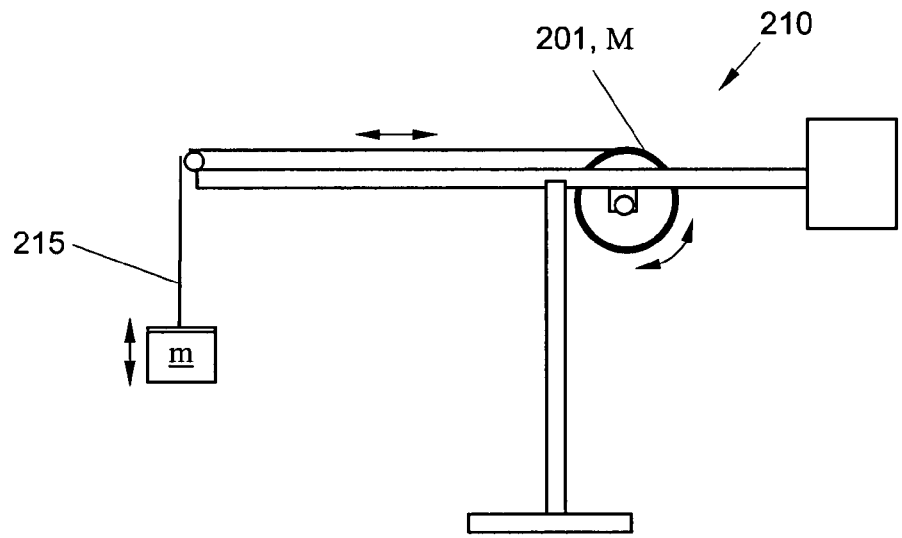
FIG. 9 schematically shows a lifting apparatus.

FIG. 9 shows an exemplary embodiment of a lifting apparatus 210, for instance a crane or a different lifting apparatus, which is provided with a drive M according to the invention. In this manner, the measuring device of the drum motor M can for instance be used in a simple manner for instantaneously measuring a lifting load of the lifting apparatus. With the aid of the sensor of the drum motor M, the mass m can for instance be determined in a simple manner, which mass is lifted by the lifting apparatus. In this case too, the drive can for instance comprise a drive according to the exemplary embodiment represented in FIGS. 1-7 while an outside of the drum 201 is used for winding and unwinding a lifting element 215, for instance a lifting cable.

Figure 10:
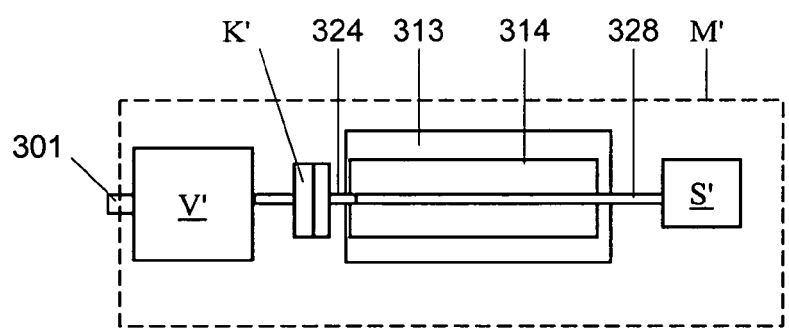
FIG. 10 schematically shows an exemplary embodiment of a motor reductor drive according to the invention.

FIG. 10 schematically shows an alternative elaboration of the invention, wherein the drive is a motor reductor drive M'. The elaboration according to FIG. 10 differs from the exemplary embodiment represented in FIGS. 1-7 in that the drive means is a driving shaft 301 coupled to an output 301 of the reduction V' of the motor reductor M'. Like the exemplary embodiment shown in FIGS. 1-7, the motor reductor drive M' in provided with an electric motor with a rotor 314, a stator 313 and a rotor shaft 324 coupled to the rotor. The rotor shaft 324 is coupled via the reduction V' to the rotatable drive means 301. The motor reductor drive M' is provided with a measuring device with a sensor S', designed for measuring, during use, a load applied by the reduction V' to the rotor shaft 324, which offers the above-mentioned advantages. As FIG. 10 schematically shows, the measuring device can for instance be designed in a similar or corresponding manner as in the exemplary embodiment shown in FIGS. 1-7. The sensor S' can for instance be designed for measuring an axial pressure applied by the rotor shaft 324.

It is evident to the skilled person that the invention is not limited to the exemplary embodiments described. Various modifications are possible within the framework of the invention as set forth in the following claims.

The drive according to the invention can for instance be used in many applications, for instance in the applications mentioned, in conveyors and/or otherwise.

The invention claimed is:

1. A drive, provided with an electric motor comprising
   a rotor,
   a stator, and
   a rotor shaft coupled to the rotor, the rotor shaft being coupled via a reduction to a rotatable drive,
   at least one measuring device for measuring a load applied during use via the reduction to the electric motor,
   the rotor shaft being pressed in an axial direction under influence of a load applied via the reduction to the rotor shaft,
   the measuring device measuring, directly or indirectly, an axial pressure applied by the rotor shaft.

2. The drive according to claim 1, provided with spring means to compensate for an axial displacement of the rotor shaft.

3. The drive according to claim 1, wherein the measuring device is provided with a torque-dependent coupling which couples the rotor shaft to the reduction.

4. The drive according to claim 3, wherein the torque-dependent coupling is provided with a coupling part non-rotatably connected to the rotor shaft, and a coupling part non-rotatably connected to a part of the reduction, the facing sides of the coupling parts being provided with recesses in which coupling balls are included, while during use, run-off surfaces of the recesses and the coupling balls cooperate for forcing the coupling parts apart when different moments of torque are applied to these coupling parts.

5. The drive according to claim 1, wherein the measuring device comprises a torque measuring shaft coupled to the rotor shaft.

6. The drive according to claim 1, wherein the drive is a drum motor, which is provided with a drum usable as a drive which extends around the rotor and the stator.

7. The drive according to claim 6, wherein the measuring device is provided with at least one sensor which is disposed outside the drum in a sensor housing.

8. The drive according to claim 1, wherein the drive is a motor reductor drive including a driving shaft coupled to the reduction.

9. Use of a drive according to claim 1, wherein a load applied via the reduction to the electric motor is measured by the at least one measuring device.

10. A lifting apparatus, provided with at least one drive according to claim 1 for driving lifting means.

11. The apparatus for testing brakes of a vehicle, the apparatus comprising rollers for bringing at least one wheel of the vehicle into rotation, at least one of the rollers including or being coupled to a drive according to claim 1 and at least one of the rollers including a drive which is a drum motor provided with a drum usable as a drive means for extending around the rotor and the stator.

12. The drive according to claim 1, wherein the rotor shaft is part of the measuring device.

13. The drive according to claim 1, wherein during use, the measuring device detects a load applied by the rotatable drive means via the reduction to the rotor shaft.

14. The drive according to claim 1, wherein the load is a torque load.

15. The drive according to claim 1, wherein a drum motor is provided on both sides with housings which are mounted on shaft journals, such that during use, the rotor is brought into rotation relative to the stator, and rotation of the rotor is transmitted via the rotor shaft, a coupling and the reduction to a drum of the rotatable drive means, such that the drum is brought into rotation relative to the shaft journals.

16. The drive according to claim 1, wherein the rotor shaft undergoes minimal displacement as a result of the load.

17. A drive, provided with an electric motor comprising
    a rotor,
    a stator, and
    a rotor shaft coupled to the rotor, the rotor shaft being coupled via a reduction to a rotatable drive,
    at least one measuring device for measuring a load applied during use via the reduction to the electric motor,
    the measuring device including at least one sensor for measuring an axial pressure of said rotor shaft.

18. The drive according to claim 17, wherein the sensor is arranged on a side of the drive remote from the reduction, while the rotor shaft is coupled to a transmission, which transmission is arranged for transmitting an axial pressure of the rotor shaft to the sensor.

\* \* \* \* \*